United States Patent
Abou-Rizk et al.

(10) Patent No.: US 10,470,155 B2
(45) Date of Patent: Nov. 5, 2019

(54) COMMISSIONING OF AN INDOOR POSITIONING SYSTEM USING A SECONDARY POSITIONING SYSTEM

(71) Applicant: ABL IP Holding LLC, Conyers, GA (US)

(72) Inventors: Mitri J. Abou-Rizk, Newton, MA (US); Jesse Grant, Needham, MA (US); Kelby Edward Green, Boston, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

(21) Appl. No.: 15/826,993

(22) Filed: Nov. 30, 2017

(65) Prior Publication Data

US 2019/0166574 A1 May 30, 2019

(51) Int. Cl.
*H04W 64/00* (2009.01)
*H04B 17/318* (2015.01)
*H04W 4/80* (2018.01)

(52) U.S. Cl.
CPC ........... *H04W 64/00* (2013.01); *H04B 17/318* (2015.01); *H04W 4/80* (2018.02)

(58) Field of Classification Search
CPC .............................. H04B 10/116; H04W 64/00
See application file for complete search history.

(56) References Cited

U.S. PATENT DOCUMENTS

| 7,127,257 B2 | 10/2006 | Riley et al. |
| 7,239,277 B2 | 7/2007 | Fullerton et al. |

(Continued)

FOREIGN PATENT DOCUMENTS

| EP | 1342384 A1 | 9/2003 |
| EP | 2653881 A1 | 10/2013 |
| EP | 2908611 A1 | 8/2015 |

OTHER PUBLICATIONS

Gezici et al., "Localization via Ultra-Wideband Radios: A Look at Positioning Aspects for Future Sensor Networks", IEEE Signal Processing Magazine, Jul. 2005, vol. 70, pp. 70-84.

(Continued)

*Primary Examiner* — Myron Wyche
(74) *Attorney, Agent, or Firm* — RatnerPrestia

(57) ABSTRACT

A system includes radio frequency (RF) communication devices, for example, in luminaires, located in a service area offering a location determination service, and a portable device used in commissioning the communication devices. The communication devices transmit a primary location determination system's RF signals for receipt by the portable device. The portable device determines its location using a secondary system. The RF communication devices' transmitted RF signals include an identifier. A received signal strength indication (RSSI) of each signal received by the portable device is measured, and stored with an estimate of the portable device's corresponding location. The portable device is moved to another location to measure RSSI of RF signals. When the number of measurements or number of locations is sufficient, the locations of each of the respective luminaires or communication devices may be determined using the RSSI values and the portable device's estimated indiscriminate location.

20 Claims, 7 Drawing Sheets

(56) References Cited

U.S. PATENT DOCUMENTS

| | | |
|---|---|---|
| 7,313,402 B1 | 12/2007 | Rahman |
| 7,362,270 B2 | 4/2008 | Srinivasan et al. |
| 7,369,859 B2 | 5/2008 | Gallagher |
| 7,397,424 B2 | 7/2008 | Houri |
| 7,561,048 B2 | 7/2009 | Yushkov et al. |
| 7,751,829 B2 | 7/2010 | Masuoka et al. |
| 7,844,679 B2 | 11/2010 | Fredriksson |
| 7,953,327 B2 | 5/2011 | Pereira et al. |
| 7,994,981 B1 | 8/2011 | Farrokhi et al. |
| 8,055,454 B2 | 11/2011 | Cohen et al. |
| 8,253,539 B2 | 8/2012 | Scaramozzino |
| 8,344,948 B2 | 1/2013 | Hol et al. |
| 8,391,891 B2 | 3/2013 | Copeland et al. |
| 8,462,049 B2 | 6/2013 | Marks et al. |
| 8,532,672 B2 | 9/2013 | Kruglick |
| 8,542,637 B2 | 9/2013 | Bandhakavi et al. |
| 8,665,762 B2 | 3/2014 | Knibbe et al. |
| 8,787,171 B2 | 7/2014 | MacNaughtan et al. |
| 8,792,901 B2 | 7/2014 | Schmidt |
| 8,868,133 B1 | 10/2014 | Rosenbaum et al. |
| 8,965,398 B2 | 2/2015 | Zhu et al. |
| 8,971,913 B2 | 3/2015 | Moeglein et al. |
| 8,994,799 B2 | 3/2015 | Ganick et al. |
| 9,008,694 B2 | 4/2015 | Fuller et al. |
| 9,063,212 B2 | 6/2015 | Jones |
| 9,158,864 B2 | 10/2015 | Berlin et al. |
| 9,167,554 B1 | 10/2015 | Sjölund et al. |
| 9,188,659 B2 | 11/2015 | Siomina et al. |
| 9,244,146 B2 | 1/2016 | Rowitch |
| 9,288,630 B2 | 3/2016 | Raman |
| 9,369,982 B2 | 6/2016 | Yang et al. |
| 9,398,422 B2 | 7/2016 | Zampini |
| 9,408,036 B2 | 8/2016 | Hart et al. |
| 9,414,192 B2 | 8/2016 | Berlin et al. |
| 9,432,963 B2 | 8/2016 | Wilmhoff et al. |
| 9,456,311 B2 | 9/2016 | Ozkan |
| 9,462,423 B1 | 10/2016 | Rivlin et al. |
| 9,509,402 B2 | 11/2016 | Ryan et al. |
| 9,516,474 B2 | 12/2016 | Finnerty et al. |
| 9,590,733 B2 | 3/2017 | George et al. |
| 9,609,525 B1 | 3/2017 | Greenberger |
| 9,635,510 B1 | 4/2017 | Chun-Nan et al. |
| 9,667,352 B2 | 5/2017 | Niewczas et al. |
| 9,711,047 B1 | 7/2017 | Knas et al. |
| 9,711,048 B1 | 7/2017 | Knas et al. |
| 9,721,451 B1 | 8/2017 | Knas et al. |
| 9,741,237 B1 | 8/2017 | Knas et al. |
| 9,877,266 B1 | 1/2018 | Knas et al. |
| 9,877,298 B1 | 1/2018 | Knas et al. |
| 9,881,484 B1 | 1/2018 | Knas et al. |
| 9,949,091 B1 | 4/2018 | Knas et al. |
| 9,984,556 B1 | 5/2018 | Knas et al. |
| 2007/0210961 A1 | 9/2007 | Romijn |
| 2009/0066473 A1 | 3/2009 | Simons |
| 2011/0028093 A1 | 2/2011 | Patel et al. |
| 2011/0034179 A1 | 2/2011 | David et al. |
| 2011/0047230 A1 | 2/2011 | McGee |
| 2012/0072106 A1 | 3/2012 | Han et al. |
| 2013/0109406 A1 | 5/2013 | Meador et al. |
| 2013/0141223 A1 | 6/2013 | Brandsma et al. |
| 2013/0170378 A1 | 7/2013 | Ray et al. |
| 2013/0225197 A1 | 8/2013 | McGregor et al. |
| 2013/0281125 A1 | 10/2013 | Schmidt |
| 2013/0310081 A1 | 11/2013 | Chu |
| 2014/0088772 A1 | 3/2014 | Lelkens |
| 2014/0274114 A1 | 9/2014 | Rowitch |
| 2014/0292568 A1* | 10/2014 | Fleming ............... G01S 5/0226 342/357.31 |
| 2015/0237164 A1 | 8/2015 | Mirzaei et al. |
| 2015/0327022 A1 | 11/2015 | Lin et al. |
| 2015/0327214 A1 | 11/2015 | Buck et al. |
| 2015/0330795 A1 | 11/2015 | Srinivasan et al. |
| 2015/0351008 A1 | 12/2015 | Mayor |
| 2015/0373482 A1 | 12/2015 | Barnard et al. |
| 2016/0050526 A1 | 2/2016 | Liu et al. |
| 2016/0077186 A1 | 3/2016 | Snapp |
| 2016/0227634 A1 | 8/2016 | Engelen et al. |
| 2016/0241338 A1 | 8/2016 | Ganick et al. |
| 2016/0323708 A1 | 11/2016 | Sahadi et al. |
| 2016/0356891 A1 | 12/2016 | Lee et al. |
| 2017/0006424 A1 | 1/2017 | Liin et al. |
| 2017/0019264 A1 | 1/2017 | Nugent et al. |
| 2017/0064665 A1* | 3/2017 | Deloach ............... H04W 64/00 |
| 2017/0105129 A1 | 4/2017 | Teplin et al. |
| 2017/0294963 A1* | 10/2017 | Lee ............... H04B 10/116 |
| 2017/0350957 A1* | 12/2017 | Yang ............... G01S 1/68 |
| 2018/0191403 A1* | 7/2018 | Pierson ............... H04B 17/318 |

OTHER PUBLICATIONS

Hol et al., "Ultra-Wideband Calibration for Indoor Positioning", Conference Paper, Oct. 2010, 5 Pages.

Sayed et al., "Network-Based Wireless Location", IEEE Signal Processing Magazine, Jul. 2005, vol. 24, pp. 24-40.

\* cited by examiner

COMMISSIONING OF AN INDOOR POSITIONING SYSTEM USING A SECONDARY POSITIONING SYSTEM

TECHNICAL FIELD

The disclosed subject matter relates to improvements in commissioning of radio frequency (RF) enabled indoor positioning-related communication devices, such as those at ceiling level that may be incorporated into luminaires.

BACKGROUND

Deployment of substantial numbers of RF devices with associated controllers and/or sensors and networking thereof presents increasing challenges for set-up and management of the system elements and network communication elements of a wireless communication system. In at least some applications, system commissioning may involve accurate determination of locations of installed RF devices.

For an RF location determination service, for example, it is desirable for the system to know the location of RF devices, such as RF beacons, so that each RF device can provide its location in an RF signal or an identification of the device in the RF signal for location lookup, to enable estimation of location of a mobile device that receives the signal. The location of each RF device in a venue is determined as a part of the commissioning operation that is typically performed soon after the RF device is installed. Depending on the number of RF devices and the size and configuration of the venue, the commissioning operation may be time consuming.

There have been recent proposals to deploy intelligent luminaires that include RF devices, such as a Bluetooth® or other wireless transceiver in each intelligent luminaire. The intelligent luminaire may include the wireless communication capability to provide an RF positioning service. Commissioning of such a Bluetooth-enabled luminaire often has involved a localized communication process between each RF (e.g. Bluetooth) enabled luminaire and an RF enabled user terminal in which each fixture is manually configured to be associated with a relative position with respect to other RF enabled luminaires in the vicinity. However, this commissioning process is costly, time consuming, and is not guaranteed to be accurate because of the human interaction required for its execution.

SUMMARY

Hence, there is a need for improvement in commissioning of such a system, e.g. to allow more rapid deployment in combination with accurate RF device location determination.

Disclosed are examples of a method, which includes a number of iterations repeated at indiscriminate locations about a service area. An iteration includes moving a portable processor-controlled, radio frequency (RF) receiver-equipped device to an indiscriminate location within the service area for the iteration. At the indiscriminate location, the indiscriminate location of the portable device within the service area is estimated using a secondary location estimating system supported by the portable device. Each iteration of the method produces a different estimated indiscriminate location at a different location within the service area. The estimated indiscriminate location for the iteration is stored in a memory as a ground truth position. The RF receiver of the portable device collects an RF communication device identifying signal transmitted by at least one RF communication device from among a plurality of RF communication devices. The RF communication device is to be commissioned in a primary system network including the plurality of RF communication devices. An RF communication device identifier of the RF communication device is obtained from the collected RF communication device identifying signal. A received signal strength indication (RSSI) value is determined of the collected, RF communication device identifying signal for the iteration. The RF communication device identifier is stored in the memory in association with the respective RSSI value and the estimated indiscriminate location for the iteration. After the number of iterations, a primary location determination service calculates a location in the service area of the RF communication device to be commissioned in the network based on, from each of the number of iterations, the determined RSSI values and the estimated indiscriminate location of the portable device for each respective iteration stored in the memory in association with the RF communication device identifier of the one RF communication device.

Also disclosed is an example of a system that includes a portable device, a secondary location estimating system, and a primary location determination system. The portable device includes a processor, a memory, a first wireless receiver and a second wireless receiver. The secondary location estimating system includes a number of wireless transmitters configured to transmit secondary system signals receivable by the second wireless receiver of the portable device, which are useable in the estimation of an indiscriminate location of the portable device. The primary location determination system includes luminaires installed within a service area. The luminaires are to be commissioned in the primary location determination system. Each respective luminaire of the plurality of luminaires includes a light source configured to provide general illumination to the service area. Each respective luminaire also includes a wireless transceiver configured to transmit a primary system radio frequency signal containing an identifier that uniquely identifies the respective luminaire as having transmitted the radio frequency signal. The processor of the portable device is configured to estimate an indiscriminate location of the portable device within the service area, using transmitted secondary system signals received via the second wireless receiver. The processor stores the estimated indiscriminate location in the memory, and collects by the first wireless receiver, a primary system radio frequency signal from each respective luminaire of the number of luminaires. The processor obtains from the collected, respective primary system radio frequency signals a respective identifier of each luminaire that transmitted a respective primary system radio frequency signal. The processor determines a respective received signal strength indication (RSSI) value of each of the collected, respective primary system radio frequency signals. Each respective luminaire identifier is stored in the memory in association with the respective RSSI value and the estimated indiscriminate location. After a number of iterations are repeated, a primary location determination service calculates a location in the service area of each respective one of the luminaires to be commissioned in the network based on, the respective RSSI values and the estimated indiscriminate location of the portable device stored in the memory in association with the respective luminaire identifier of each respective luminaire of the plurality of luminaires to be commissioned in the primary system network.

In another system example, a system includes a portable device, a secondary location estimating system, and a primary location determination system. The portable device includes a processor, a memory, a first wireless receiver and a second wireless receiver. The secondary location estimating system includes a plurality of wireless transmitters configured to transmit secondary system signals receivable by the second wireless receiver of the portable device. The secondary system signals are usable in an estimation of an indiscriminate location of the portable device. The primary location determination system includes a plurality of radio frequency communication devices to be commissioned in the primary location determination system that are installed within a service area. Each respective radio frequency communication device of the plurality of radio frequency communication devices includes a wireless transceiver. The wireless transceiver is configured to transmit a primary system radio frequency signal containing an identifier that uniquely identifies the respective radio frequency communication device as having transmitted the radio frequency signal. For a number of iterations at indiscriminate locations about a service area, the processor of the portable device is configured, for an iteration of the number of iterations, to estimate the indiscriminate location of the portable device within the service area using a secondary location estimating system supported by the portable device. Each iteration produces a different estimated indiscriminate location at a different location within the service area. The estimated indiscriminate location for the iteration is stored in a memory as a ground truth position. The RF receiver of the portable device collects an RF communication device identifying signal transmitted by one RF communication device from among a plurality of RF communication devices. The one RF communication device is to be commissioned in a primary system network including the plurality of RF communication devices. An RF communication device identifier of the one RF communication device is obtained from the collected RF communication device identifying signal. A received signal strength indication (RSSI) value is determined of the collected, RF communication device identifying signal for the iteration. The RF communication device identifier is stored in the memory in association with the respective RSSI value and the estimated indiscriminate location for the iteration.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The figures depict one or more implementations in accordance with the present teachings by way of example only, not by way of limitation. In the figures, like reference numbers refer to the same or similar elements.

DETAILED DESCRIPTION

Figure 1:
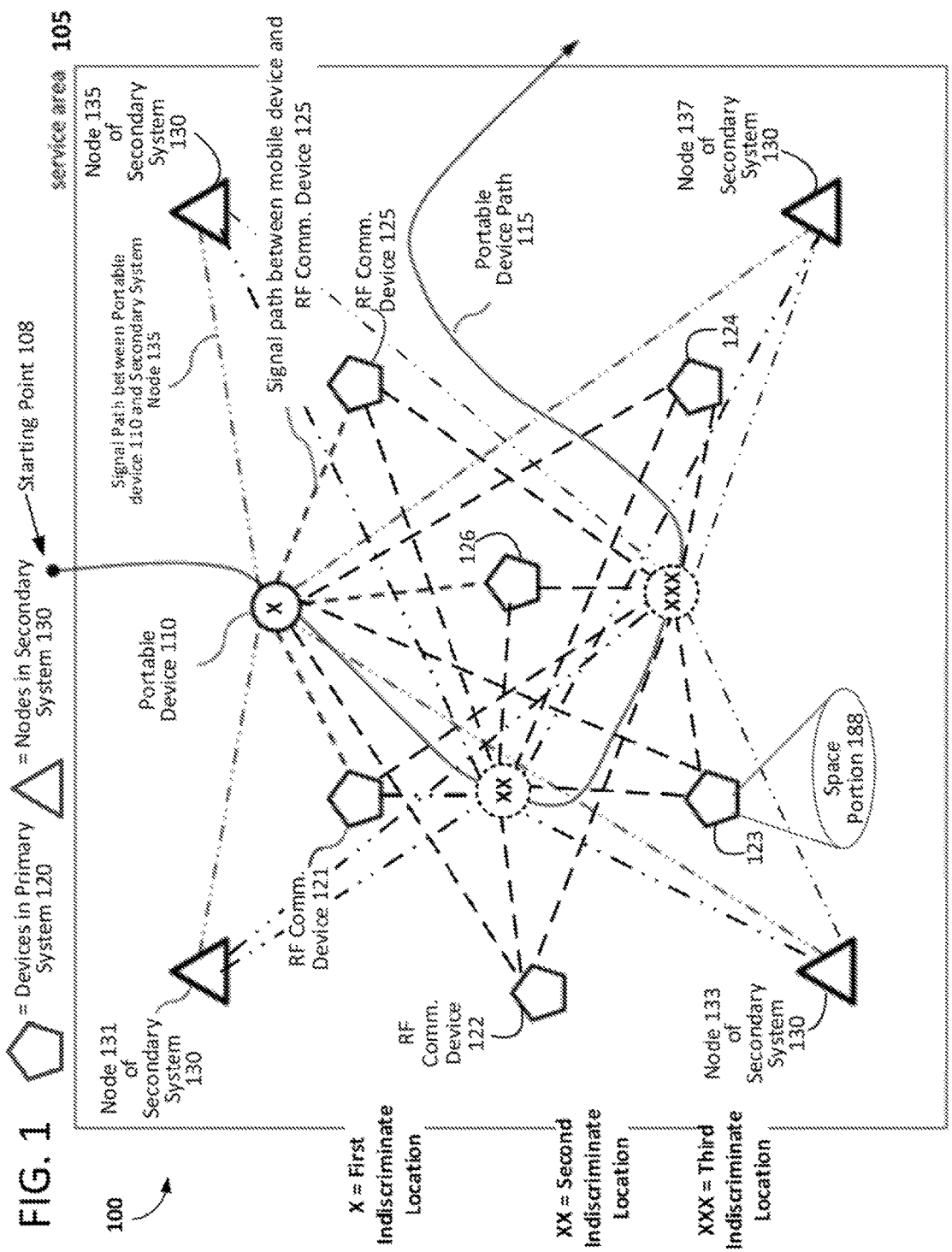
FIG. 1 shows an example of a system layout that implements a process for determining a location of individual RF communication devices in a network of RF communication devices utilizing a secondary location estimating system.

In the following detailed description, numerous specific details are set forth by way of examples in order to provide a thorough understanding of the relevant teachings. However, it should be apparent that the present teachings may be practiced without such details. In other instances, well-known methods, procedures, and/or components have been described at a relatively high level, without detailed comment in order to avoid unnecessarily obscuring aspects of the present teachings.

The term "luminaire" as used herein is intended to encompass essentially any type of device that processes power to generate light, for example, for illumination of a space intended for use of or occupancy or observation. Luminaires, such as light fixtures, floor or table lamps, or other types of lighting devices for artificial general illumination are widely used in various residential, commercial and industrial settings for providing illumination in both interior and exterior spaces. For example, a retail store may install multiple luminaires in the ceiling for illuminating products and walking area throughout an indoor area, such as a store.

The examples of a primary indoor positioning system (or, "primary system") use Bluetooth® Low Energy (BLE) or other radio-frequency (RF) communication devices. The ground truth process utilizing a secondary positioning system (or, "secondary system), however, may utilize other types of RF communication technologies, such as Wi-Fi, Zigbee, local area network (LAN), or ultra wide band (UWB) when applied during commissioning of primary indoor positioning systems. Alternatively, the secondary system may use optical systems, such as visible-light location determination systems or optical spatial mapping. A system of devices, such as RF communication device or luminaires equipped with RF communication devices to be commissioned is herein called a "primary" system.

Commissioning such a primary system includes, for example, estimating the physical locations of the RF communication devices (which may be located in or collocated with ceiling-mounted luminaires) of the primary system. Results of these location estimations during commissioning can be used by a positioning service included in or coupled to the primary system to derive locations for other devices (e.g., locations of cell phones, RF tags) by receiving from or exchanging signals with the RF communication devices. Commissioning is useful for enabling a system to know where the RF communication devices are located. Without knowledge of the locations of the RF communication devices, the primary system may be unable to provide accurate location assistance to other devices within the space.

Additionally, in prior systems, commissioning is often a time-consuming, labor-intensive, error-prone process that entails RF communication device-by-RF communication device manual determination of RF communication device locations.

In order to accurately determine a location of the RF communication device within an indoor space and with reference to other RF communication devices installed within the indoor space, a point of reference or a "ground truth" location with respect to the indoor space may be determined. Using this accurately determined point of reference or ground truth, a location determination service may use various techniques to determine the locations of the RF communication devices that are associated in a data structure with an identifier of RF communication device. The association of the accurately determined position of the RF communication device with its respective RF communication device identifier is called "commissioning." For example, the location of each respective RF communication device to be commissioned is determined with reference to the "ground truth," or point of reference. In some examples, the RF communication devices may be incorporated in luminaires located within the indoor space, and in such cases the RF communication devices may be generally referred to as "luminaires."

The method and system examples described herein provide for an improved commissioning process and commissioning system for executing the disclosed processes that reduces the amount of time needed for commissioning, eliminates errors related to input and/or use of incorrect location information, and/or improves accuracy due to the collection of multiple measurements.

FIG. 1 shows an example of a system layout in which a secondary system 130 provides a ground truth determination that enables a network of RF communication devices 121-126 of a primary location determination system 120 to be commissioned. The RF communication devices 121-126 may each be equipped with an RF receiver, transmitter or transceiver, a processor and other components. Examples the RF communication devices 121-126 described in more detail with reference to the example of FIG. 4B. Depending upon the type of location in which the RF communication devices 121-126 are installed, the RF communication devices 121-126 may be configured as luminaires as described with reference to the example shown in FIG. 4A.

The RF communication devices 121-126 of the primary system 120 may be coupled to, incorporated in, or collocated with luminaires with associated processors and wireless transceivers (shown in other examples). Deployment involves provisioning the RF communication devices/luminaires 121-126 for communication and configuration or commissioning of the RF communication devices/luminaires 121-126 for appropriate operation in the service area 105. For position estimation and/or location based service applications, system commissioning involves accurate determination of locations of installed RF communication devices/luminaires 121-126. One example in which a commissioning process may be significant relates a radio frequency-based location determination service. In such an example, it may be desirable for customers' or workers' mobile devices to be in communication with the lighting system to know the location of the luminaires, which may be used to indicate the location of the customers' or workers' mobile device. When using the location determination service, a mobile device or the like may receive or look up an accurate RF communication device/luminaire location that the mobile device uses to obtain an estimate of its own location or position. Examples of position determination for commissioning using the RF communication capabilities of the luminaires are described in more detail below.

In the example of FIG. 1, the location determination service area 105 includes RF communication devices of a primary system 120 (shown as pentagons) and nodes of a secondary system 130 (shown as triangles). The number of secondary system nodes may be N secondary system nodes (here, N=4; triangles), M RF communication devices (here, M=6; pentagons), and a portable device 110. The portable device 110 may follow a path, such as 115, that eventually brings the portable device 110 within range of all RF communication devices serving the space. The process 200 of FIG. 2 may be summarized as RF measurements are made at some number of indiscriminate locations, in this case, at points K (i.e., X, XX and XXX) along the portable device path 115. At each (kth) point, the portable device 110 communicates with the nodes 131-135 of the secondary system 130 for a ground truth estimation of location of the kth point. At each point, the portable device 110 also communicates with a subset of the total number of primary system RF communication devices 121-126, e.g. receives RF signals from the subset of RF communication devices. For example, only signals from a subset of the total number of RF communication devices may be collected due to signals broadcast by some of the RF communication devices 121-126 being undetectable by the portable device 110 due to inference from, for example, the layout of service area 105 or other structural elements (e.g., shelving units, walls or the like). The signals transmitted by the respective RF communication devices includes a RF communication device identifier (ID) that uniquely identifies the RF communication device within the primary system 120. From the collected signals, at least two data items (such as RF communication device ID and a signal attribute such as received signal strength indication (RSSI) value) may be recorded for each RF communication device detectable at each indiscriminate location (e.g., X, XX and XXX). Wireless communication paths for the RF communication devices of the primary system 120 with the mobile device at the indiscriminate locations X, XX and XXX are indicated by the bold dashed line, and the wireless communication paths for the secondary system 130 with the mobile device at the indiscriminate locations X, XX and XXX are indicated by the dash-dot-dot lines. In the example of FIG. 1, there are three single measurement points (i.e. Mk=3) along the path 115. A total of K locations (each either an x,y pair or x,y,z triplet) and $\Sigma_k M_k$ RF communication device ID+RSSI pairs are recorded during traversal of the path 115.

An indoor space may include a location determination service area 105, which is an area serviced by a primary system having RF communication devices or other devices that enable a server or a user/client device (not shown in this examples) to determine location of the user/client device in the indoor space. A user/client device may be a mobile phone, a tablet device, a laptop computer, an inventory control device, or the like. The primary system 120 is used to determine the position of location of the user/client device relative to locations of the RF communication devices as determined during the commissioning process. The secondary system 130 is used to determine the position of RF communication devices 121-126 in a network of RF communication devices with respect to the portable device 110 in the service area 105.

The secondary system 130 is configured to provide a ground truth reference indication usable in the commissioning of the RF communication devices 121-126. The ground truth reference indication may be, for example, grid coordinates (e.g., X, Y, Z) related to the specific indoor space, latitude and longitude coordinates, retail store section indicators (e.g., center of Home Goods, East end of Aisle 21), or the like. A "ground truth" is a position within the service area 105 that is considered a known position that serves as a reference position that when combined with the primary system measurements made by the portable device 110 enables the relative positions of one or more of the RF communication devices 121-126 to be determined.

In an example, the primary system 120 may include a plurality of luminaires configured as RF communication devices to provide radio frequency-based location determination services in the service area 105. Each luminaire, such as RF communication device 121-126, includes a light source, a processor and radio frequency (RF) transceiver (all of which are described in more detail with reference to the example of FIG. 4). The RF communication devices of the primary system 120 are typically installed in the indoor space service area 105 with reference to a lighting map, e.g., a paper blueprint or electronic blueprint of the service area 105. A service area 105 may be an indoor area that is provided indoor positioning service (i.e., position determination and/or indoor navigation) by an indoor positioning system.

The RF communication devices 121-126 may be incorporated in luminaires, which provide general illumination to the space within the service area 105. For example, when configured as a luminaire, RF communication device 123 may provide general illumination to, for example, a space portion 188 of the space in service area 105. In examples, in which the respective RF communication devices 121-126 are incorporated in luminaires in the service area 105, a lighting map may be used to show the relative locations of the respective luminaires incorporating a respective one of the RF communication devices 121-126 incorporated in luminaires in the service area 105. However, the lighting map does not necessarily guarantee that the luminaire/RF communication devices 121-126 are installed in the precise locations shown on the lighting map. In addition, the number of RF communication devices that have to be manually installed in a typical big-box retailer store may be upwards of 1000, so placement mistakes during installation are likely to occur. As a result, the lighting map is not relied upon as providing the absolute position for the respective luminaire and/or RF communication device. An accurate position of the RF communication device is relevant because in, for example, a big-box retail installation, the RF communication devices, such as 121-126, may be used to provide location determination services to a consumer's mobile device within the service area 105. For example, a consumer or worker may wish to know where a specific item is located within the retail installation. The consumer or worker may interact with a retail store computer application that utilizes the location determination service available in the retail store location. In response to the consumer or worker interaction, a location of the specific item may be provided to the consumer's or a worker's mobile device.

As shown in FIG. 1, the secondary system 130 is made up of a relatively small number of devices 131, 133, 135 and 137 the precise positions of which are either known apriori or determined using various techniques and/or measurement devices, such as manual entry, RF positioning devices, visible light communication devices, or the like. The secondary system devices 131, 133, 135 and 137 facilitate the quick and accurate "ground truth" determination of a portable device 110 within the service area 105. For example, the devices 131, 133, 135 and 137 of the secondary system 130 may operate on physical principles that are the same as or different from those of the primary system 120. In a specific example, the secondary system 130 may rely on visual data for location determination, and not RF data. In another example, the secondary system 130 may be used to determine a position using a different RF frequency, RF system, or RF protocols as compared to the RF frequency, system or protocols used by the primary system 120. In an example, a secondary system, such as 130, may be unsuitable as a positioning system for the devices that the primary system 120 is intended serve; thus, in such an example, the primary system 120 cannot simply be substituted for the secondary system 130. Examples of secondary system 130 RF configuration details may be ultra wideband, Wi-Fi, Zigbee, X-10, Z-wave, Bluetooth®, 900 MHz or the like. Alternatively or in addition, the secondary system 130 may use visible light to communicate with a portable device to provide the location determination services to the portable device 110. In another example, the secondary system 130 may be configured with a spatial mapping optical system that generates a map of the service area 105 which is used by location determination services to provide the location of the portable device 110.

In an example, nodes of the secondary system 130 may be ultra wideband (UWB)-equipped nodes 131, 133, 135 and 137 that together enable the determination of the precise location of the portable device 110. The RF communication devices 121-126 of the primary system 120, in this example, are configured to operate according to the Bluetooth Low Energy (BLE) specification. The RF communication devices 121-126 of the primary system 120 may be mobile phones and/or BLE-enabled asset tracking tags. The secondary system 130 need not be integrated with luminaires or even be ceiling-mounted. The secondary system 130 may be deployed either temporarily or permanently in the service area 105.

The secondary location estimating system 130 may be configured to be quickly and easily set-up as compared to a typical primary system 130. For example, a UWB-equipped secondary system 130 may have only a few nodes (e.g., four) to provide an accurate ground truth indication for a portable device, such as 110, within the service area 105. A precise location is associated with each node 131, 133, 135, 137 of the UWB secondary system 130. Identifying the precise location might require manual entry of its node locations, but only a few nodes may be needed; techniques exist for calibrating a system with only a few nodes in minutes, without need for using elaborate surveying equipment at the node locations. Location determination techniques may include manual determination using a surveyor's plot made of the indoor space during construction, use of an imaging device, a radio frequency system, optical signals from a visible light communication positioning system, or the like. Once precise locations are determined and associated with each UWB node, the UWB-enabled secondary system 130 may be used to estimate an accurate indiscriminate location of the portable device 110 within the service area 105. Once the accurate indiscriminate location of the portable device 110 is estimated, the portable device 110, as described in more detail with reference to the examples of FIGS. 2 and 3, facilitates the rapid commissioning of a primary system having a large number of nodes.

Figure 2:
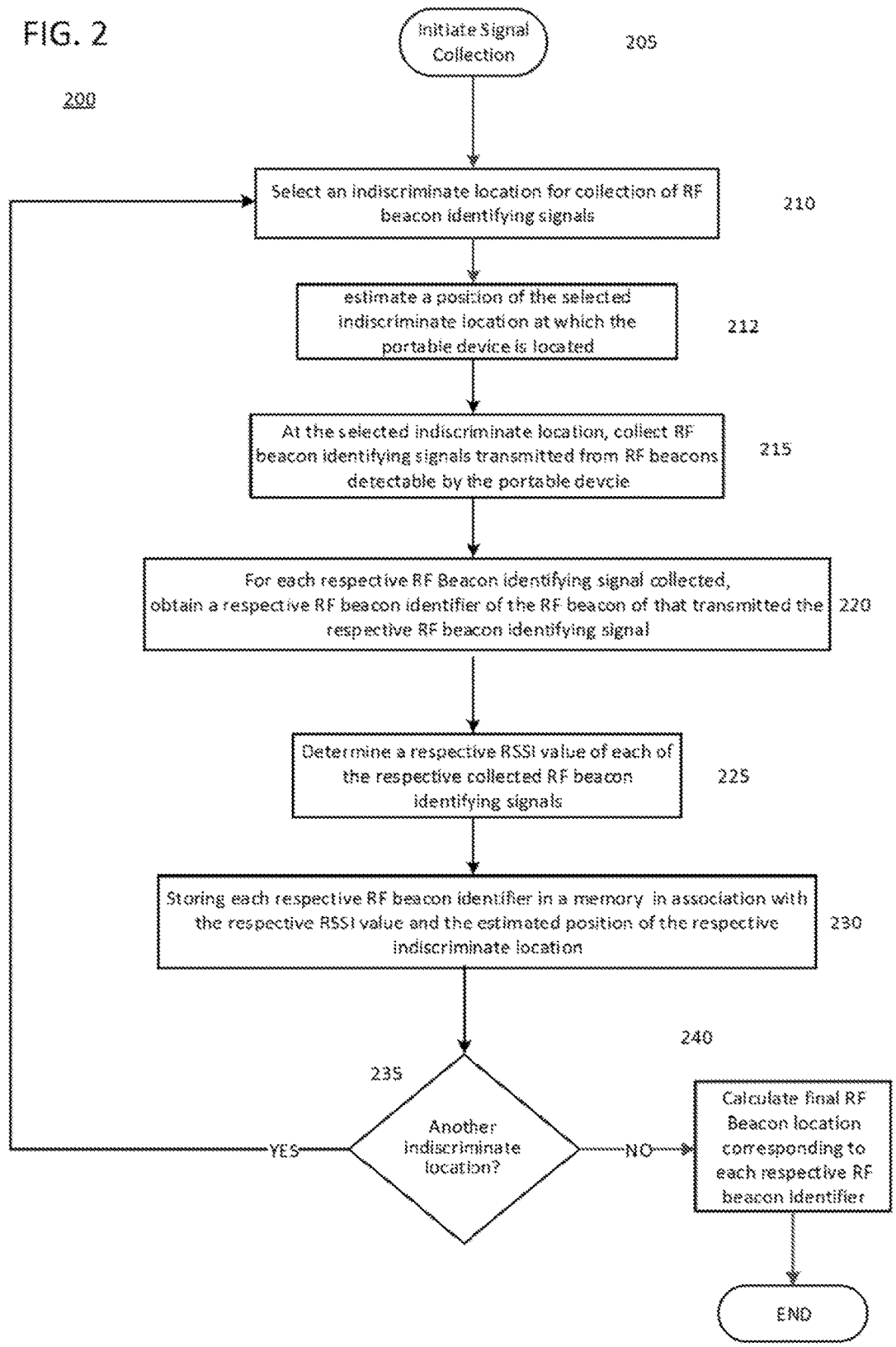
FIG. 2 shows a flowchart example of a process for determining a location of individual RF communication devices in a network of RF communication devices utilizing a secondary location estimating system, used in a ground truth process for commissioning.

It may now be appropriate to provide an example so the operation of and the interaction between the secondary system and the primary system may be better understood. FIG. 2 shows a flowchart of an example process for determining a location of individual RF communication devices in a network of RF communication devices utilizing nodes in a secondary system, such as 130 of FIG. 1, to provide a ground truth determination for the location determination service. FIG. 1 illustrates relationships at indiscriminate locations within a service area during a commissioning process using a UWB ground truth secondary system for a BLE primary positioning system.

As an initial step in the example, the locations of the secondary system nodes 131, 133, 135 and 137 within the service area 105 are determined. As mentioned above, the precise location determination of the secondary system nodes 131-137 may be performed using accurate, rapid and precise location determination techniques as mentioned previously. For example, the secondary system 130 may be a temporary system a purpose of which may be to provide the ground truth indication to a portable device 110, so a subsequent commission process may be performed on RF communication device 121-126 of the primary system 120. Alternatively, the secondary system 130 may be a permanent system installed in the service area 105.

Once the positions of the secondary system nodes 131, 133, 135 and 137 are known and stored in a data storage (described in a later example), the process 200 illustrated in FIG. 2 may be implemented. In the specific example of FIG. 1, the secondary system 130 may use a UWB frequency for communication with the portable device, and may communicate according to a communication protocol appropriate for the UWB frequency being used. In some examples, the primary system 120 in the example of FIG. 2 may operate according to the BLE specification.

The details of the primary and secondary positioning system will be described in more detail with reference to the examples of FIGS. 3-7. An example of a process utilizing the primary location determination system and secondary positioning system to enable commissioning of a number of RF communication devices is described in more detail with reference to FIG. 2

The UWB secondary system 130 set up in the service area 105 is anticipated to have a range that extends throughout the service area 105, and provide high-accuracy position readings (e.g., accuracy in decimeter range) for a specialized UWB-enabled mobile device, such as portable device 110 in this example. The portable device 110 may be conveyed by a human operator, robot, airborne drone, pushcart, or other conveyance within the service area 105.

An example of a signal collection process is described with reference to FIG. 2. The signal collection process 200 may be an iterative process. In FIG. 2, the process 200 is initiated at 205 on a portable processor-controlled, radio frequency (RF) receiver-equipped device, such as the portable device 110. The portable device 110 may be moved to an indiscriminate location within the service area for an iteration. From a starting point, such as 108, an indiscriminate location within a service area, such as 105, may be selected for collection of RF communication device identifying signals (210). The selected indiscriminate location may be the same as the ground truth reference indication described above with reference to FIG. 1. Similar to the ground truth reference indication, the selected indiscriminate location may be represented, for example, by grid coordinates (e.g., such as Cartesian X, Y, Z, polar coordinates or the like) related to the service area, latitude and longitude coordinates, retail store section indicators (e.g., center of Home Goods, East end of Aisle 21), or the like. At the selected indiscriminate location, such as indiscriminate location X within service area 105, the portable device 110 estimates its position as the selected indiscriminate location (212) within the service area 105 by using the signals of the secondary system 130. The selected estimated indiscriminate location is the same as the estimated position of the portable device. For example, the first indiscriminate location X may be selected as the indiscriminate location, and, at step 212, a position of the portable device 110 at the first indiscriminate location X in the service area 105 is estimated based on signals (e.g., optical or RF, such as UWB) received from the secondary system nodes 131, 133, 135 and 137. Upon determining the estimated indiscriminate location, the portable device 110 has also determined its own estimated position. The portable device 110 may store coordinates of the estimated indiscriminate location in a memory.

A network of RF communication devices 121-126 of primary system 120 that are to be commissioned into a location determination system are installed in service area 105. Each RF communication device 121-126 in the primary system 120 transmits an RF communication device identifying signal including a respective RF communication device identifier. For example, the RF communication device 121 is assigned an RF communication device identifier that uniquely identifies the RF communication device 121, the RF communication device 122 is assigned an RF communication device identifier that uniquely identifies the RF communication device 122, and so on for the RF communication devices in the primary system 120.

While at the selected indiscriminate location, such as the first indiscriminate location X, an RF receiver (described in more detail with reference to the example of FIG. 3) of the portable device 110 collects RF communication device identifying signals transmitted from each of the respective RF communication devices 121-126 that are within range of the portable device 110 (215). For example, also at 215, an RF receiver of the portable device 110 collects an RF communication device identifying signal transmitted by another RF communication device from among the plurality of RF communication devices. The other RF communication device is to be commissioned in the primary system network including the plurality of RF communication devices. The RF communication device identifying signals may, for example, be Bluetooth specification compliant signals, such as Bluetooth Low Energy (BLE) or the like.

The RF communication device identifying signal transmitted by each of the respective RF communication devices 121-126 may include, for example, the unique identifier that identifies the respective RF communication device in the primary system 120. At 220, a respective RF communication device identifier may be obtained, for example, from the collected RF communication device identifying signals. The respective RF communication device identifier being used by a processor of the portable device 110 to identify the respective RF communication device that transmitted the collected respective RF communication device identifying signal. From the collected RF communication device identifying signal transmitted by the other RF communication device, an RF communication device identifier of the other RF communication device may be obtained.

For each RF communication device identifying signal collected at the selected indiscriminate location, a respective received signal strength indication (RSSI) may be measured (225). For example, an RF receiver/transceiver (shown in another example) in the portable device 110 may be configured to measure the RSSI value for each RF communication device identifying signal collected, and output the RSSI value for each RF communication device identifying signal collected. For example, the RF receiver/transceiver may output the determined RSSI to a processor of the portable device 110 for processing. Of course, other received signal information may be measured or determined, such as time of arrival, time delay of arrival, or the like, that may be used to estimate a location within the service area, such as 105, of the respective RF communication devices of RF communication devices 121-126 from which RF communication device signals were collected. Also at 225, an RSSI value of the collected RF communication device identifying signal transmitted by the other RF communication device for the iteration may be determined.

At 230, each respective RF identifier may be stored in a memory in association with the respective RSSI value and the position of the selected estimated indiscriminate location, such as first indiscriminate location X. The RF communication device identifier of the other RF communication device is stored in the memory, in association with the RSSI value, and the estimated indiscriminate location at which the RF communication device identifying signal transmitted by the other RF communication device is collected.

In response to the storing step 230, the process 200 inquires at 235 if another indiscriminate location is to be selected. If the answer is YES, the process 200 returns to step 210 and steps 212, 215, 220, 225 230 and 235 are repeated.

There may be different conditions that determine the answer to the inquiry at 235. For example, the response to the inquiry at 235 may be NO when it is determined by the mobile device 110 processor or other computing device that a large enough set of collected signals (e.g., 100, 1000, 2500 or the like) has been stored to determine the position of each RF communication device with an acceptable accuracy. If the quantity of collected signals is insufficient, the response at 235 may be YES. In response to the YES determination, the process 200 returns to step 210. Upon return to step 210, another indiscriminate location is selected for the collection of RF communication device identifying signals. In, for example, a next iteration of process 200, steps 210-235 may be repeated as the portable device 110 moves from the first indiscriminate location X along an arbitrary portable device path 115 to a second indiscriminate location XX within the service area 105 as shown in FIG. 1. In the next iteration of step 210, the portable device 110 using the RF signals emitted by the nodes 131, 133, 135 and 137 of the secondary system 130 estimates a position of the second indiscriminate location XX within the service area 105.

The determination at 235 may be based on the number of RF communication device identifying signals that are collected by the portable device. For example, it may be anticipated that a predetermined number, such as 100, 250 or more, of collected RF communication device identifying signals provides sufficient coverage to enable the accurate calculation of the location of all of the RF communication devices. The collection of RF communication device identifying signals may also occur, in some examples, at regularly timed intervals after selection of the initial indiscriminate location. Regardless of the conditions used in making the determination at 235, when the response to the inquiry at 235 is NO, the process 200 proceeds to 240.

For example, after the predetermined number of signals are collected and the NO determination is made at 240, the portable device 110 may transmit (e.g., via a wireless network such as a local area network or the Internet) the information for each of the indiscriminate locations to another computing device (e.g., a server or network gateway) to be processed. The other computing device may be coupled to a data storage device enabling storage of the information in the data storage device. At 240, the server, network gateway, other computing device, the portable device or a combination thereof coupled to or with access to a primary location determination service, such as primary system 120, may calculate a location in the service area of each respective one of the RF communication devices to be commissioned in the network based on, from each of the number of iterations that corresponds to the number of estimated indiscriminate locations, the respective RSSI values and the estimated indiscriminate location of the portable device for the respective iteration in association with the RF communication device identifier of the one RF communication device to be commissioned in the primary system network. For example, the respective RSSI values and the estimated indiscriminate location of the portable device may be stored in the memory in association with the respective RF communication device identifier of each respective one of the RF communication devices to be commissioned in the primary system network.

The information for each of the indiscriminate locations may include data points such as the estimated locations of the respective RF communication devices, the respective communication device IDs, RSSIs of the RF identifying signals collected from the respective RF communication device and the like. For example, with regard to the other RF communication device, the primary location determination service may calculate a location in the service area of the other RF communication device based on, from each of the number of iterations, the RSSI value of the collected RF communication device identifying signal transmitted by the other RF communication device and the estimated indiscriminate location of the portable device for the respective iteration stored in the memory in association with the RF communication device identifier of the other RF communication device to be commissioned in the primary system network. In an example, the minimum information needed to generate a map of the locations of the RF communication devices are the respective RSSI values of the collected RF communication device identifying signals and the indiscriminate locations. To specifically identify which RF communication device is at a particular map location in the map, the communication device identifiers may also be used when generating the map of locations.

For example, the information enables the calculation of all RF communication device locations using a suitable algorithm, such as, for example, a two-dimensional (2D) Gaussian fit algorithm or the like. For example, the 2D Gaussian fit algorithm may be applied to the RSSI values between each respective one of the RF communication devices and the selected indiscriminate location the additional location determinations of each of the luminaires in the plurality of luminaires. In other examples, the 2D Gaussian fit algorithm may be applied to data representing the primary system radio frequency signals collected at each of the additional indiscriminate locations and the estimated location of each of the additional indiscriminate locations. In addition or alternatively, any of a number of well-known trilateration algorithms may be used to calculate the locations of the RF communication devices within the service area 105. Calculations at 240 may be performed on the portable device 110, a back-end computer, another calculating device or a distributed network of devices (examples of which are described with reference to which the information acquired by the portable device 110 may be transmitted.

With the RF communication device locations calculated and delivered to a controller or server implementing the primary positioning system 120, a first aspect of the commissioning process is finished. As the portable device 110 explores the service area 105 as described above, the portable device 110 is brought within range of all the RF communication devices nodes. The identifier in the RF communication device identifying signal is intended to be a unique code, however, in rare instances, errors occur and a code may be duplicated. Another aspect of the final commissioning process may be for the primary system 120 to resolve such RF communication device identifier assignment errors and others (e.g., non-communicative communication devices) should they occur.

Location information recorded by the portable device 110 may be used to calculate positions of the luminaire/RF communication devices 121-126 in either two dimensions (2-D) or three dimensions (3-D) in various examples. Although not necessary, multiple secondary system 130 devices may be used simultaneously thereby further reducing the time necessary for commissioning the primary system RF communication devices 121-126.

A suitable algorithm may determine in real time, as the portable device 110 explores the service area 105, when enough information has been collected to enable solution for nodes of a BLE system of known extent. It is thus possible for another algorithm to spatially direct the explorations of a mobile UWB device (e.g., on a drone) so as to quickly obtain sufficient information, and to command the mobile device to end its exploration when sufficient information has been obtained. This approach may reduce the amount of time needed to make accurate RF communication device location determinations, thereby making additional explorations unnecessary.

In addition or alternatively, RF signal characteristics other than RSSI such as angle of arrival and/or angle of departure, may be measured and used in calculations of RF communication device locations at 240. Data from other sources, such as visible light communications, may also be incorporated in such calculations to enable the position determination of the luminaires/RF communication devices 121-126 of the primary system 120.

Figure 3:
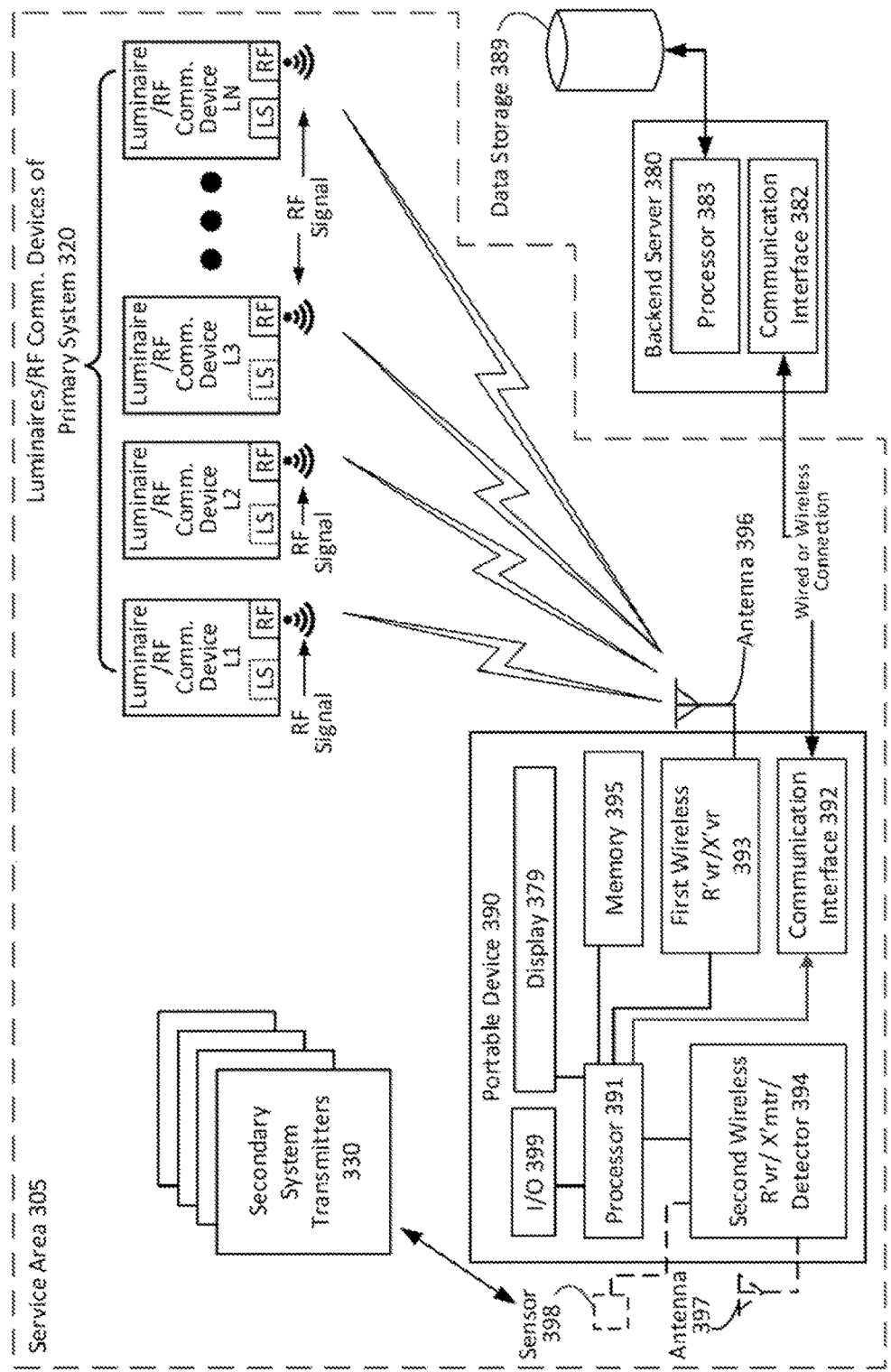
FIG. 3 illustrates a functional block diagram of an example of a commissioning system including a primary indoor positioning system and a secondary location estimating system, and portable device that uses the commissioning system in a commissioning process.

FIG. 3 illustrates a functional block diagram of an example of a commissioning system including a primary system and a secondary system installed within a service area. The system 300 includes a secondary system 330, a number of luminaires/RF communication devices L1-LN of a primary system 320, a portable device 390 and a backend server 380.

As discussed with reference to FIG. 1, the secondary system 330 is used to provide a "ground truth" or precise location to the portable device 390 within the service area 305. In more detail, the secondary system 330 may, for example, be an alternate positioning system located within the service area in which a primary position determination system 120 is located. The secondary system transmitters 330 may incorporate UWB technology, such as IEEE 802.15.4a, that allows for position determination of the secondary system devices without interfering with communications of the primary system 320.

The secondary system 330 may use Wi-Fi frequencies, Bluetooth, visible light communication signals, manual positioning methods (e.g., measuring devices surveying equipment or the like), or other position determining systems and/or methods. In some examples, the secondary system 330 may include, as shown in FIG. 1, several transmitting devices positioned at known locations in an area serviced by the primary position determination system 120. The several transmitting devices of the secondary system 330 may be temporarily installed in the service area 305.

The portable device 390 may, for example, include a processor 391, a memory 395, a first wireless radio frequency (RF) receiver/transceiver 393 usable with the primary system (also referred to as "primary system receiver/transceiver"), a communication interface 392, and a second wireless receiver/detector 394 usable with the secondary system (also referred to as "secondary system receiver/transmitter/detector"). The processor 391 is coupled to the memory 395, the RF receiver/transceiver 393, communication interface 392, and the secondary system receiver/detector 394. In some examples, the RF receiver/transceiver 393 may be considered a first wireless receiver, and the secondary system receiver/detector 394 may be considered a second wireless receiver. For example, the memory 395 may store programming code executable by the processor 391. Upon execution of the programming code, the processor 391 may be configured to control operation of the various components and perform functions as part of the primary system commissioning process. Examples of such functions include received secondary system signals, obtaining measurement information related to the received secondary system signals and determining the position of the portable device based on the obtained measurement information, as well as other functions examples of which are described herein.

Depending upon the implementation of the secondary system 330, the portable device 390 may have a sensor 398 to detect optical signals, for example, from a visible light communication implementation of the secondary system 330, an antenna 397 to receive radio frequency signals, for example, from an RF implementation of the secondary system 330, or both. For example, the optical sensor 398 may be configured with a photodiode, a camera and/or other optical sensor that enables detection of optical signals. A radio frequency receiver may be coupled to the antenna 397 to receive RF signals. In some examples, the secondary system receiver/detector 394 may be a dual optical sensor arrangement allows the portable device 390, for example, to be used in nearly any service area regardless of the configuration and/or capabilities of the secondary system transmitters 330. Alternatively, the secondary system receiver/detector may be a camera that collects images of the service area 305, and delivers the collected images to the processor 390, the processor 383 of the backend server 380 or both. Either the processor 390 or the processor 383 of the backend server 380 may utilize image processing techniques on the collected images to generate a mapping of the service area 305. The mapping may indicate the relative spatial dimensions and orientation of objects within the service area 305. Using the mapping, the location of the portable device within the service area 305 may be estimated.

The system 300 may perform operations such as those described with reference to FIG. 2 above. In a further example of the system 300 operation, the portable device 390 may estimate additional indiscriminate locations of the portable device 390 as the portable device moves within the service area 305. The processor 391 may use secondary system signals received via the second wireless receiver 394 to perform the estimates of the additional indiscriminate locations, such as X, XX and XXX of FIG. 1. The portable device 390 may collect primary system radio frequency signals via the first wireless receiver 393 from each respective luminaire of the plurality of luminaires L1-LN when the portable device 390 is at each of the additional indiscriminate locations. The portable device 390 may determine location determinations of each of the plurality of luminaires L1-LN in the primary system 320 by using the primary system radio frequency signals collected at each of the additional indiscriminate locations and the estimated location of each of the additional indiscriminate locations. The processor 390 may also be coupled to input/output devices (I/O) 399 and a display 379. The I/O 399 may be a keypad, keyboard, tactile device, a speaker or the like. The display 379 may be a device for presentation the location determination of the luminaires or RF communication devices L1-LN. Alternatively, the I/O 399 and the display 399 may be combined as a touchscreen. Using the display and input/outputs (I/O), the processor 391 may present the location determinations to a user during or after the process example described above with respect to FIG. 2.

The RF transceiver 393 is coupled to antenna 396 that enables wireless RF communication with the luminaires/RF communication devices L1-LN of the primary system 120. The communication interface 392 of the portable device 390 may be coupled to a backend server 380. The backend server 380 may serve as a location server that determines the positions of the luminaires/RF communication devices L1-LN of the primary system 120. The backend server 380 may also have a processor 380 and a communication interface 382 that is coupled via either a wireless connection or wired connection to the communication interface 392 of the portable device 390. The wireless connection of the communication interface 392 may different from the communication protocol used by the RF transceiver 393. For example, the RF transceiver 393 may be configured to receive and transmit signals via a BLE communication protocol, while the communication interface 392 may communicate via one or more of the family of IEEE 802.11xx protocols or the like. Alternatively or in addition, the wired connection between the communication interface 392 of the portable device 390 and the communication interface 382 of the backend server 380 may be a universal serial bus (USB), an Ethernet, or other type of wired connection.

When the luminaires/RF communication devices L1-LN of the primary system 320 are configured as RF communication devices, each of the luminaires/RF communication devices L1-LN includes a radio frequency transceiver RF, in which case the light source LS for general illumination may be optional.

Figure 4A:
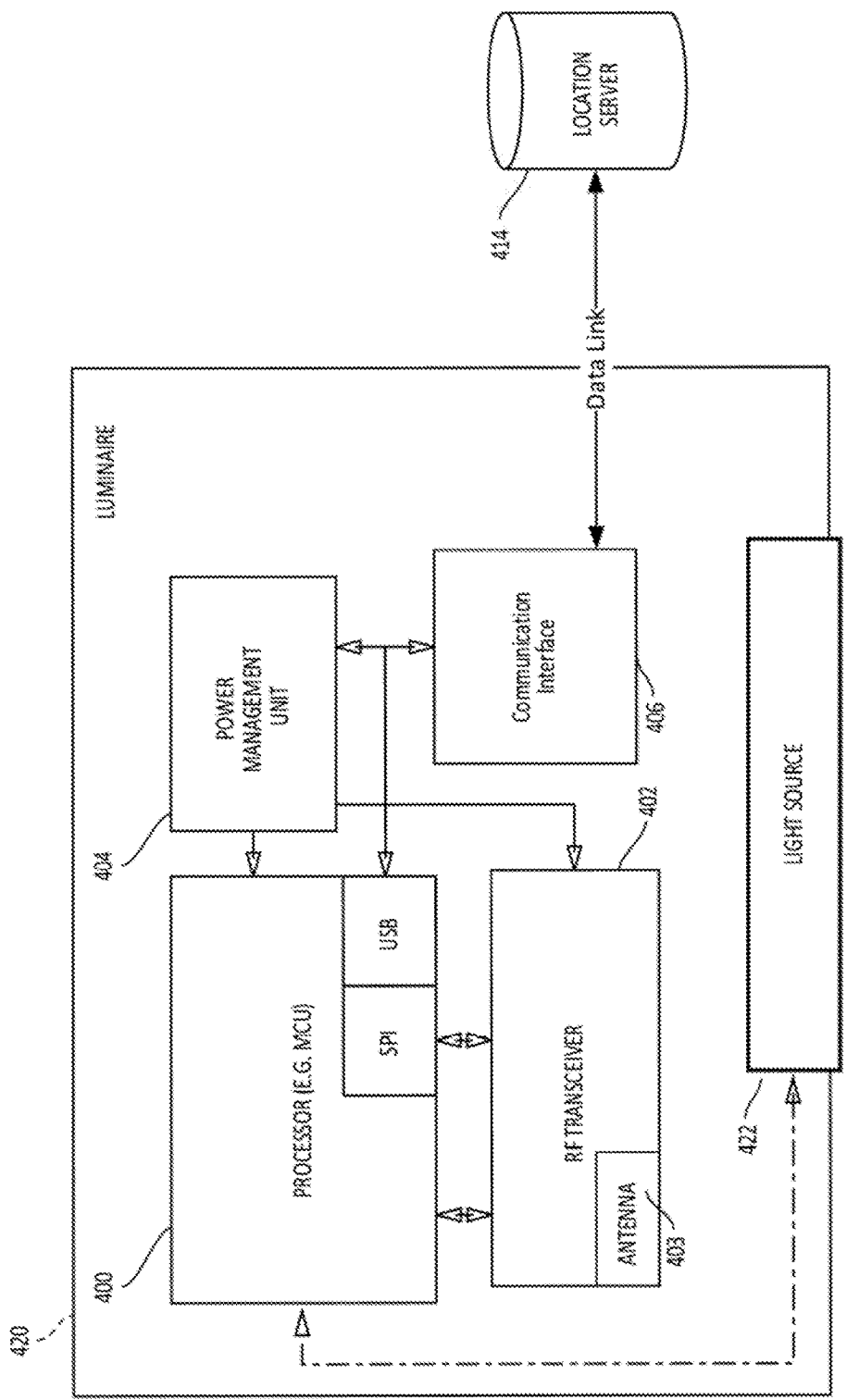
FIG. 4A shows a system diagram of a RF-enabled luminaire which may participate in the commissioning process utilizing the secondary location estimating system examples described herein.

The following discussion of FIG. 4A describes an example of a luminaire implementation of a luminaire/RF communication device in more detail. For example, a luminaire 420 may be one of the luminaires/RF communication devices L1-LN of the primary system 320. When the luminaire/RF communication devices L1-LN of FIG. 3 are configured as luminaires, each luminaire 420 may include a light source 422, a processor 400, a power management unit 404, a communication port 406 and an RF transceiver 402. The light source 422 of the respective luminaire 420 may provide general illumination to the space within a service area, such as 305. The RF transceiver 402 of the respective luminaire 420 may receive radio frequency signals from and transmit radio frequency signals to a portable device, such as the portable device 390 of FIG. 3. The RF transceiver 402 may be coupled to the processor 400 via a system packet interface (SPI) or the like. The RF transceiver 420 may communicate with the portable device 390 utilizing BLE specification compliant signals.

As mentioned above, each luminaire includes a light source 422. The actual light source in each luminaire may be any type of light emitting unit. Examples of light sources include light emitting diodes (LEDs), incandescent or fluorescent lamps, halogen or halide lamps, neon tubes, etc.

Although shown as one combined unit, the elements of the luminaire may be implemented somewhat separately, e.g. with the light source of a luminaire separated from but controlled by an associated processor of the luminaire. Alternatively, one processor may control some number of light sources and RF transceiver(s) at diverse locations about a service area. The power management unit 404 is connected to an electrical power supply (not shown) and provides the appropriate electrical power to the respective components of the luminaire 420.

In the examples of FIG. 4A, the luminaire 420 is shown as having one processor 400, for convenience. In some instances, such a lighting device may have multiple processors. For example, a particular device configuration may utilize a multi-core processor architecture. Also, some of the other components, such as the communications interfaces, may themselves include processors. Alternatively, the processor 400 and associated memory in the luminaire may be components of a Micro-Control Unit (MCU), which is a microchip device that incorporates a processor 400 serving as a programmable central processing unit (CPU) as well as one or more of memories. The MCU 400 may be thought of as a small computer or computer-like device formed on a single chip.

A location server 414 has a communication link/session for data communication with circuitry and/or programming of the luminaire 420. A data link from the location server 414 is shown going through the communication interface 406.

The RF transceiver 402 may be implemented using a variety of wireless radio frequency transceiver technologies. Examples of RF wireless transceivers include Bluetooth transceivers, Wi-Fi transceivers, 900 MHz (sub-GHz) wireless transceivers, ultra-wideband (UWB) transceivers, or the like. An example of relevant luminaire related data (e.g. referenced in FIG. 2) uses BLE transceivers and may conform to the Bluetooth® wireless communication specification.

In general, processor 400 of luminaire 420 controls the other components of the luminaire. For example, processor 400 controls RF transceiver 402 to communicate with other RF-equipped luminaires, other RF devices, such as the portable device 390, mobile phones and the like. The processor 400 controls other aspects of operation of the light source 422, such as light output intensity level, associated color characteristic(s) of the light output, focus and/or aiming of the light output, etc. Of note for purposes of discussion of several operational examples, the processor controls communications RF-based ranging operations via the transceiver 402 and associated communications relating to location estimations and the like with the location server 414.

The example of FIG. 4A illustrates an example of the location server 414 implemented as a server that includes a data communication interface for packet data communication (e.g. with one or more of the luminaires and other assets) via the particular type of available network (not separately shown) with other devices. The data communication interface may be wired or wireless. For communication with luminaires, like 420, the communication interface of the server will be similar to or otherwise compatible with the RF wireless communication capabilities of the transceiver 402 of the luminaire(s).

The location server 414 may be a physical server computer on the network that the system is connected to via wireless or wired medium. It could also be implemented as a server instance running in the cloud. Alternatively, the server for the server 414 could be a processor on a luminaire (either 400 in FIG. 4A or a separate processor). Perhaps, the location server 414 could be a form of distributed processing system, e.g. a server program that runs on the processors of some number of luminaires.

Figure 4B:
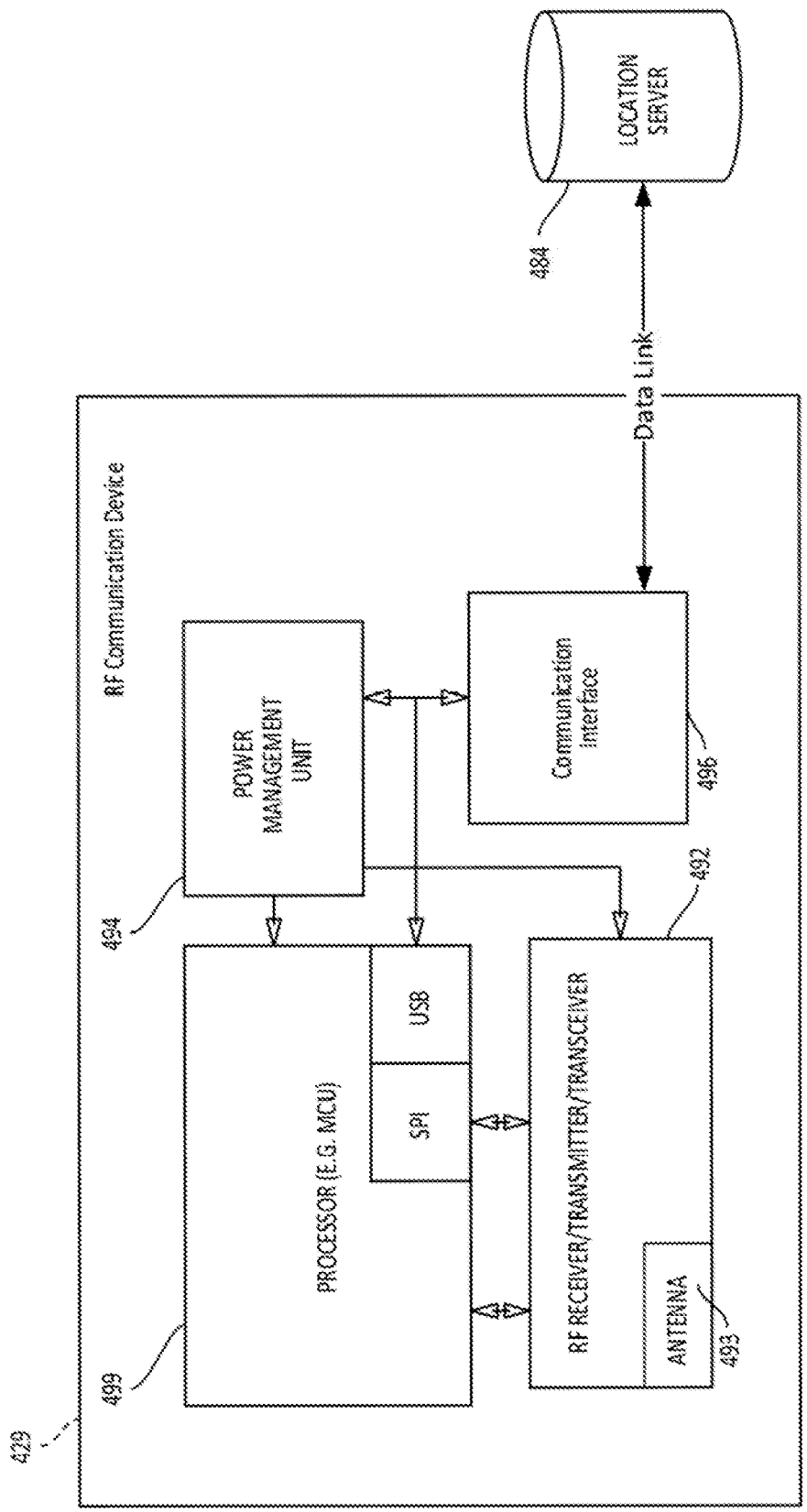
FIG. 4B shows a system diagram of a RF-enabled communication device which may participate in the commissioning process utilizing the secondary location estimating system examples described herein.

FIG. 4B shows a system diagram of a RF-enabled communication device which may participate in the commissioning process utilizing the secondary location estimating system examples described herein. The implementation of a RF communication device as shown in FIG. 4B is substantially similar to the RF-enabled luminaire of FIG. 4A, therefore a detailed discussion of the functions and details of the similar elements will be omitted. For example, the RF communication device 429 includes a processor 499, a power management unit 494, a communication interface 496 and a RF receiver/transmitter/transceiver 492.

The RF transceiver 492 may receive radio frequency signals from and transmit radio frequency signals to a portable device, such as the portable device 390 of FIG. 3. The RF transceiver 492 may be coupled to the processor 499 via a system packet interface (SPI) or the like. The RF transceiver 492 may communicate with the portable device 390 utilizing BLE specification compliant signals. Similar to power management unit 404 of FIG. 4A, the power management unit 494 is connected to an electrical power supply (not shown) and provides the appropriate electrical power to the respective components of the RF communication device 429.

The processor 499 is configured in a similar as processor 400 of FIG. 4A so a detailed discussion is omitted.

The communication interface 496 includes a data link that couples to a location server 494. The location server 494 has a communication link/session for data communication with circuitry and/or programming of the RF communication device 429.

The RF transceiver 492 may be implemented using a variety of wireless radio frequency transceiver technologies utilizing one or more antennas, such as antenna 493. Examples of RF wireless transceivers include Bluetooth transceivers, Wi-Fi transceivers, 900 MHz (sub-GHz) wireless transceivers, ultra-wideband (UWB) transceivers, or the like. An example of relevant related data (e.g. referenced in FIG. 2) uses BLE transceivers and may conform to the Bluetooth® wireless communication specification.

In general, processor 499 of RF communication device 429 controls the other components of the RF communication device. For example, processor 499 controls RF transceiver 492 to communicate with other RF communication devices, portable devices, such as 390 of FIG. 3, mobile phones, computing devices and the like. The processor 499 controls communications RF-based ranging operations via the transceiver 492 and associated communications relating to location estimations, location determinations, and the like with the location server 494.

As shown by the above discussion, functions relating to the mobile device indiscriminate location determinations, the determination of the locations of the luminaire/RF communication devices and related location based services may be implemented on computers connected for data communication via the components of a packet data network, operating as a server computer, user terminal and/or as mobile device. Although special purpose devices may be used, such devices also may be implemented using one or more hardware platforms intended to represent a general class of data processing device commonly used to run "server" programming, for example, to perform functions attributed to the configuration server discussed above, albeit with an appropriate network connection for data communication.

As known in the data processing and communications arts, a general-purpose computer typically includes a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files for the communication device ID codes and associated communication device positions obtained during commissioning. The software code is executable by the general-purpose computer that functions as the configuration server and/or that functions as a mobile device. In operation, the code may be stored within the server, such as 380. At other times, however, the software may be stored at other locations and/or transported for loading into the appropriate general-purpose computer system. Execution of such code by a processor of the computer platform enables the platform to implement appropriate aspects of the communication device commissioning methodology for a positioning system, in essentially the manner performed in the implementations discussed and illustrated herein.

Figure 5:
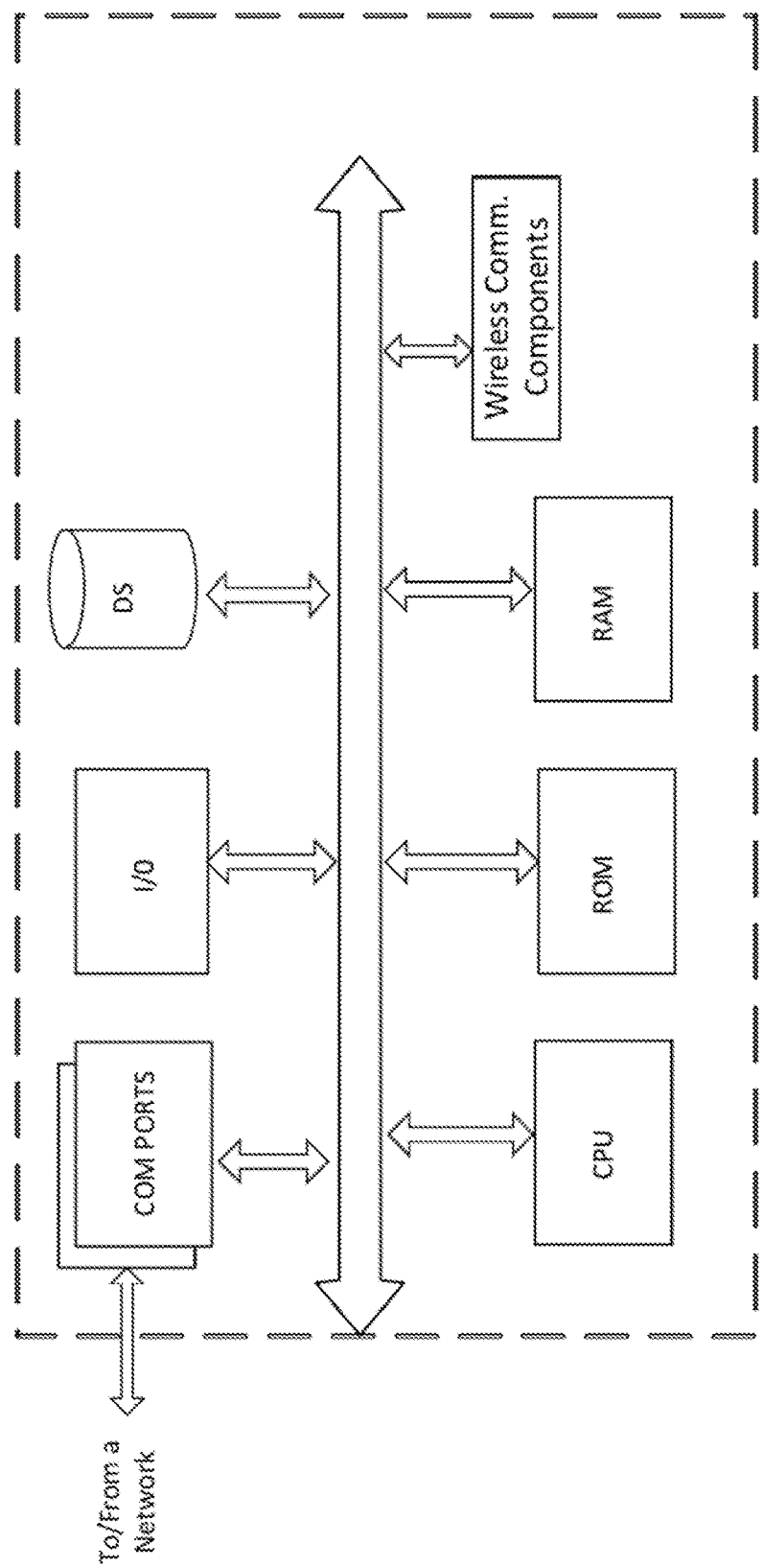
FIG. 5 is a simplified functional block diagram of a computer configured as a server, for example, to function as a location server in the illustrated examples.

For purposes of further discussion, FIG. 5 shows a computer platform as an example of an implementation of the hardware for a server configured/programmed as an appropriate backend server, such as 380 of FIG. 3 or location server, 414 of FIG. 4A or 494 of FIG. 4B. The server computer includes a CPU for executing program instructions, such as the appropriate server application program(s). The computer server platform typically includes an internal communication bus, program storage, such as memories (ROM and RAM) and/or data storage DS, for various data files to be processed and/or communicated by the server, although the server often receives programming and data via network communications. Of course, the server functions may be implemented in a distributed fashion on a number of similar hardware platforms, to distribute the processing load. Also, a computer configured as a server with respect to one layer or function may be configured as a client of a server in a different layer and/or for a different function. It is believed that those skilled in the art are adequately familiar with the structure, programming and general operation of computer equipment, such as that shown in FIG. 5, and as a result, the drawing should be self-explanatory.

Hardware of a server computer (FIG. 5), for example (backend server 380 of FIG. 3 and location server 414 of FIG. 4), includes a data communication interface or input/output (I/O) for packet data communication. The server computer also includes a central processing unit (CPU), in the form of circuitry forming one or more processors, for executing program instructions. The server platform hardware typically includes an internal communication bus, program and/or data storage for various programs and data files to be processed and/or communicated by the server computer, although the server computer often receives programming and data via network communications.

Alternatively, some smartphone type mobile devices may be configured, for example, as shown in FIG. 5 may include similar but smaller input and output elements. For example, portable devices, such as tablets and other types of smartphone type mobile devices utilize touch sensitive display screens, instead of separate keyboard and cursor control elements. The hardware elements, operating systems and programming languages of such user terminal devices also are conventional in nature, and it is presumed that those skilled in the art are adequately familiar therewith. For example, the wireless communication components may enable a portable processor controlled, RF receiver-equipped device to communicate with a secondary system node, as described above to estimate an indiscriminate location of the RF receiver-equipped device. In addition, the RF receiver-equipped device may also be configured to communicate with RF communication devices that are to be commissioned into a primary system, such as that described in the examples of FIGS. 1-4B. The wireless components of FIG. 5 may include a RF receiver, transmitter or transceiver and/or related circuitry to facilitate any configuration of the RF receiver-equipped device.

Figure 6:
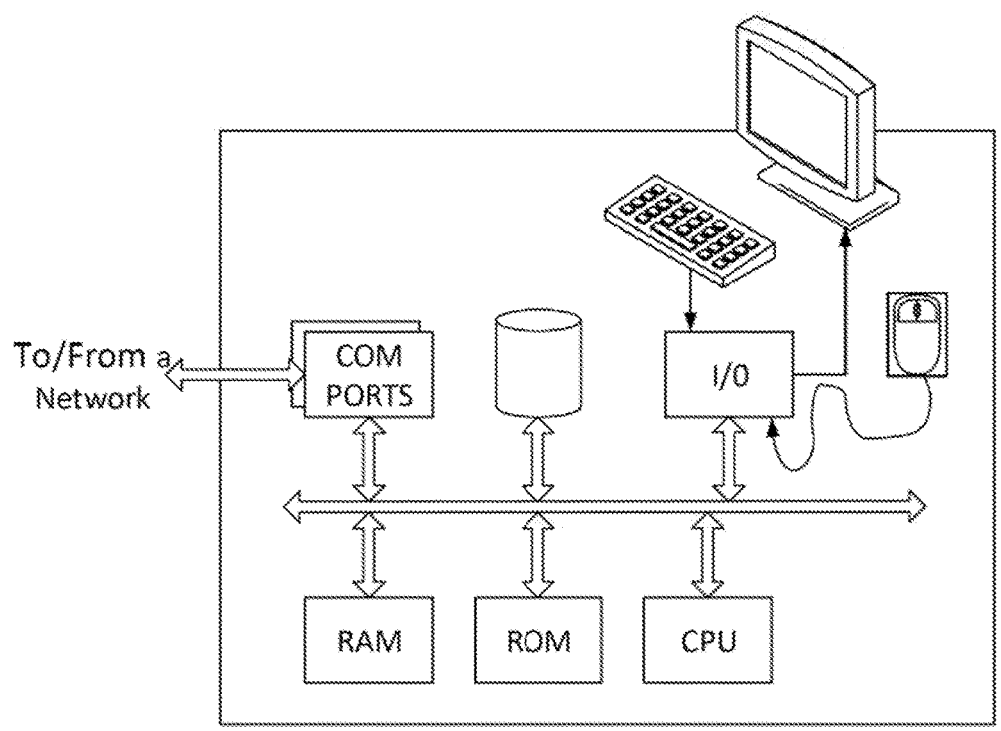
FIG. 6 is a simplified functional block diagram of a computer device having input output capabilities.

FIG. 6 depicts a computer with user interface elements, as may be used to implement a portable device or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

Hardware of a computer type user terminal device, such as a PC or tablet computer, may include a data communication interface, CPU, main memory and one or more mass storage devices for storing user data and the various executable programs (see FIG. 6). The various types of user terminal devices will also include various user input and output elements. A computer, for example, may include a keyboard and a cursor control/selection device such as a mouse, trackball, joystick or touchpad; and a display for visual outputs, or a touchscreen display for input and output. A microphone and speaker enable audio input and output.

Hence, aspects of the methods collecting signals, determining locations and generating data for commissioning luminaires or RF communication devices in an indoor positioning system outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming and/or the relevant data. All or portions of the software and/or the relevant data may at times be communicated through the Internet, telecommunication networks, or various other data networks. Such communications, for example, may enable loading of the programming and the database from one computer or processor into another, for example, from a management server or host computer of an enterprise location, or more generally, the location determination or estimation service provider into the computer platform and on-line to perform the relevant server functions in an actual working environment. Thus, another type of media that may bear the software elements and data includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that includes the element.

While the foregoing has described examples in some detail, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Thus the following claims are hereby incorporated into the Detailed Description, with each claim standing on its own as a separately claimed subject matter.

What is claimed is:

1. A method for commissioning one of a plurality of RF communication devices, comprising:
repeating for a number of iterations at indiscriminate locations within a service area, an iteration of the number of iterations, comprising:
moving a portable processor-controlled, radio frequency (RF) receiver-equipped device to an indiscriminate location within the service area for the iteration;
estimating the indiscriminate location of the portable device within the service area using a secondary location estimating system supported by the portable device, wherein each iteration produces a different estimated indiscriminate location at a different location within the service area;
storing the estimated indiscriminate location for the iteration in a memory as a ground truth position of the portable device;
collecting, by the RF receiver of the portable device, an RF communication device identifying signal transmitted by one RF communication device from among the plurality of RF communication devices in the service area, wherein the one RF communication device is being commissioned in a primary system network including the plurality of RF communication devices;

obtaining from the collected RF communication device identifying signal an RF communication device identifier of the one RF communication device; and determining a received signal strength indication (RSSI) value of the collected, RF communication device identifying signal for the iteration; and storing the RF communication device identifier, in the memory, in association with the respective RSSI value and the estimated indiscriminate location for the iteration; and after the number of iterations, the commissioning comprises:

calculating, by a primary location determination service, a location in the service area of the one RF communication device being commissioned in the primary system network based on, from each of the number of iterations, the determined RSSI values and the estimated indiscriminate location of the portable device, using the secondary location estimation system, for the respective iteration stored in the memory in association with the RF communication device identifier of the one RF communication device being commissioned in the primary system network.

2. The method of claim 1, further comprising:
during each of the number of iterations:
collecting, by the RF receiver of the portable device, an RF communication device identifying signal transmitted by another RF communication device from among the plurality of RF communication devices, wherein the other RF communication device is being commissioned in the primary system network including the plurality of RF communication devices;

obtaining, from the collected RF communication device identifying signal transmitted by the other RF communication device, an RF communication device identifier of the other RF communication device;

determining an RSSI value of the collected RF communication device identifying signal transmitted by the other RF communication device for the iteration; and storing the RF communication device identifier of the other RF communication device, in the memory, in association with the RSSI value, the estimated indiscriminate location at which the RF communication device identifying signal transmitted by the other RF communication device is collected; and after the number of iterations, the commissioning comprises:

calculating, by the primary location determination service, a location in the service area of the other RF communication device based on, from each of the number of iterations, the RSSI value of the collected RF communication device identifying signal transmitted by the other RF communication device and the estimated indiscriminate location of the portable device for the respective iteration stored in the memory in association with the RF communication device identifier of the other RF communication device to be commissioned in the primary system network.

3. The method of claim 1, wherein determining the RSSI value of the collected, respective RF communication device identifying signals, comprises:

measuring, by the RF receiver, the received signal strength indication value of the collected RF communication device identifying signal.

4. The method of claim 1, further comprising:
transmitting, by the RF communication device, the RF communication device identifying signal as Bluetooth specification compliant signal.

5. The method of claim 1, wherein calculating, by the primary location determination service, a location in the service area of each respective one of the RF communication devices to be commissioned in the network, comprises:

computing, by a location server, the location in the service area of each respective one of the RF communication devices using trilateration.

6. The method of claim 1, wherein calculating, by the primary location determination service, a location in the service area of the one RF communication device to be commissioned in the network, comprises:

obtaining the respective RSSI values corresponding to the one RF communication device using the one RF communication device's stored identifier; and determining, by a processor of a location server, a location of the one RF communication device based on the obtained respective RSSI values corresponding to the one RF communication device and the respective estimated indiscriminate locations at which the obtained respective RSSI values were measured.

7. The method of claim 6, wherein determining the location of the one RF communication device, further comprises:

applying a two-dimensional Gaussian fit algorithm to the obtained respective RSSI values corresponding to the one RF communication device and the respective estimated indiscriminate locations at which the obtained respective RSSI values were measured.

8. The method of claim 1, wherein estimating an indiscriminate location of the portable device within the service area using a secondary location estimating system, comprises:

receiving by the portable device when at the indiscriminate location, at least three different secondary system radio frequency signals, wherein each of the at least three different secondary system radio frequency signals are transmitted from at least three respective secondary system transmitters, and the secondary system radio frequency signals are of a radio frequency different from the RF communication device identifying signals transmitted by the primary system;

determining a received signal strength of each of the at least three different secondary system radio frequency signals;

calculating a location of the portable device using the determined received signal strength of each of the at least three different secondary system radio frequency signals and a known location of each of the at least three different secondary system transmitters that transmitted a respective one of the at least three different secondary system radio frequency signals; and using the calculated location of the portable device as the estimated indiscriminate location.

9. The method of claim 1, wherein estimating the indiscriminate location of the portable device within the service area using the secondary location estimating system, comprises:

receiving by the portable device when at the indiscriminate location an optical signal transmitted from a transmitter of the secondary system;

determining a location of the portable device based on the optical signal; and using the determined location of the portable device as the estimated indiscriminate location.

10. The method of claim 1 further comprising:
received secondary location estimation system signals;
obtaining measurement information related to the received secondary location estimation system signals; and
storing the obtained measurement information for use in estimating the indiscriminate location.

11. The method of claim 10, wherein the secondary system signals are ultra-wideband radio frequency signals.

12. The method of claim 10, wherein the secondary location estimating system signals are Bluetooth specification compliant radio frequency signals.

13. A system for commissioning one of a plurality of luminaires, comprising:
a portable device, comprising a processor, a memory, a first wireless receiver and a second wireless receiver;
a secondary location estimating system comprising a plurality of wireless transmitters configured to transmit secondary system signals receivable by the second wireless receiver of the portable device usable in an estimation of an indiscriminate location of the portable device; and
a primary location determination system including the plurality of luminaires installed within a service area, the plurality of luminaires being commissioned in the primary location determination system, wherein the primary location determination system is different from the secondary location estimating system,
each respective luminaire of the plurality of luminaires including a light source configured to provide general illumination to the service area, and a wireless transceiver configured to transmit a primary system radio frequency signal containing an identifier that uniquely identifies the respective luminaire as having transmitted the radio frequency signal;
wherein the processor of the portable device is configured to:
in each of a number of iterations:
estimate an indiscriminate location of the portable device within the service area, using the transmitted secondary system signals received via the second wireless receiver;
store the estimated indiscriminate location of the portable device in the memory;
collect, by the first wireless receiver, the primary system radio frequency signal from each respective luminaire of a number of the luminaires;
obtain from the collected, respective collected primary system radio frequency signals respective identifiers of the number luminaires; and
determine a respective received signal strength indication (RSSI) value of each of the collected, respective primary system radio frequency signals; and
store each respective obtained luminaire identifier, in the memory, in association with the respective RSSI value of the collected, respective primary system radio frequency signal from which the respective luminaire identifier was obtained, and the estimated indiscriminate location; and
a primary location determination service, configured to, after repeating for the number of iterations, the commissioning comprises:
calculating a location in the service area of each respective one of the luminaries being commissioned in the primary location determination system based on, respective RSSI values and estimated indiscriminate locations of the portable device stored in the memory in association with the respective luminaire identifiers of the each plurality of luminaires being commissioned in the primary location determination system.

14. The system of claim 13, wherein the secondary system signals are ultra-wideband radio frequency signals.

15. The system of claim 13, wherein the secondary system signals are Bluetooth specification compliant radio frequency signals.

16. The system of claim 13, wherein the secondary system signals are optical signals.

17. The system of claim 13, wherein the portable device processor is further configured to:
estimate additional indiscriminate locations of the portable device as the portable device moves within the service area, wherein the estimate uses secondary system signals received via the second wireless receiver;
collect primary system radio frequency signals via the first wireless receiver from each respective luminaire of the plurality of luminaires when the portable device is at each of the additional indiscriminate locations; and
determine additional location determinations of each of the luminaires in the plurality of luminaires by using the primary system radio frequency signals collected at each of the additional indiscriminate locations and the estimated location of each of the additional indiscriminate locations.

18. The system of claim 17, wherein, when determining the additional location determinations of each of the luminaires in the plurality of luminaires the processor is further configured to:
utilize a two-dimensional Gaussian fit algorithm that is applied to data representing the primary system radio frequency signals collected at each of the additional indiscriminate locations and the estimated location of each of the additional indiscriminate locations.

19. A system for commissioning one of a plurality of radio frequency communication devices, comprising:
a portable device, comprising a processor, a memory, a first wireless receiver and a second wireless receiver;
a secondary location estimating system comprising a plurality of wireless transmitters configured to transmit secondary system signals receivable by the second wireless receiver of the portable device usable in an estimation of an indiscriminate location of the portable device; and
a primary location determination system including the plurality of radio frequency communication devices installed within a service area, the plurality of radio frequency communication devices being commissioned in the primary location determination system, wherein the primary location determination system is different from the secondary location estimating system,
each respective radio frequency communication device of the plurality of radio frequency communication devices including a wireless transceiver configured to transmit a primary system radio frequency signal containing an identifier that uniquely identifies the respective radio frequency communication device as having transmitted the radio frequency signal;

wherein, for a number of iterations at indiscriminate locations within a service area, the processor of the portable device for an iteration of the number of iterations, is configured to:
  estimate the indiscriminate location of the portable device within the service area using the secondary location estimating system supported by the portable device, wherein each iteration produces a different estimated indiscriminate location at a different location within the service area;
  store the estimated indiscriminate location of the portable device for the iteration in a memory as a ground truth position;
  collect, by the RF receiver of the portable device, an RF communication device identifying signal transmitted by one RF communication device from among a plurality of RF communication devices, wherein the one RF communication device is being commissioned in a primary system network including the plurality of RF communication devices;
  obtain from the collected RF communication device identifying signal an RF communication device identifier of the one RF communication device; and
  determine a received signal strength indication (RSSI) value of the collected, RF communication device identifying signal for the iteration; and
  store the RF communication device identifier, in the memory, in association with the respective RSSI value and the estimated indiscriminate location for the iteration; and
after the number of iterations, the commissioning comprises:
  calculating, by a primary location determination service, a location in the service area of the one RF communication device being commissioned in the primary location determination system based on, from each of the number of iterations, the determined RSSI values and the estimated indiscriminate location of the portable device for the respective iteration stored in the memory in association with the RF communication device identifier of the one RF communication device being commissioned in the primary location determination system.

20. The system of claim 19, wherein the processor of the portable device is further configured to:
  during each of the number of iterations:
    collect, by the RF receiver of the portable device, an RF communication device identifying signal transmitted by another RF communication device from among the plurality of RF communication devices, wherein the other RF communication device is to be commissioned in the primary system network including the plurality of RF communication devices;
    obtain, from the collected RF communication device identifying signal transmitted by the other RF communication device, an RF communication device identifier of the other RF communication device;
    determine an RSSI value of the collected RF communication device identifying signal transmitted by the other RF communication device for the iteration; and
    store the RF communication device identifier of the other RF communication device, in the memory, in association with the RSSI value, the estimated indiscriminate location at which the RF communication device identifying signal transmitted by the other RF communication device is collected; and
  after the number of iterations, the commissioning comprises:
    calculating, by the primary location determination service, a location in the service area of the other RF communication device based on, from each of the number of iterations, the RSSI value of the collected RF communication device identifying signal transmitted by the other RF communication device and the estimated indiscriminate location of the portable device for the respective iteration stored in the memory in association with the RF communication device identifier of the other RF communication device to be commissioned in the primary system network.

* * * * *